Sept. 6, 1927.
B. F. SAVERY
1,641,905
AUTOMOBILE HEADLIGHT SWITCH
Filed Oct. 1, 1925
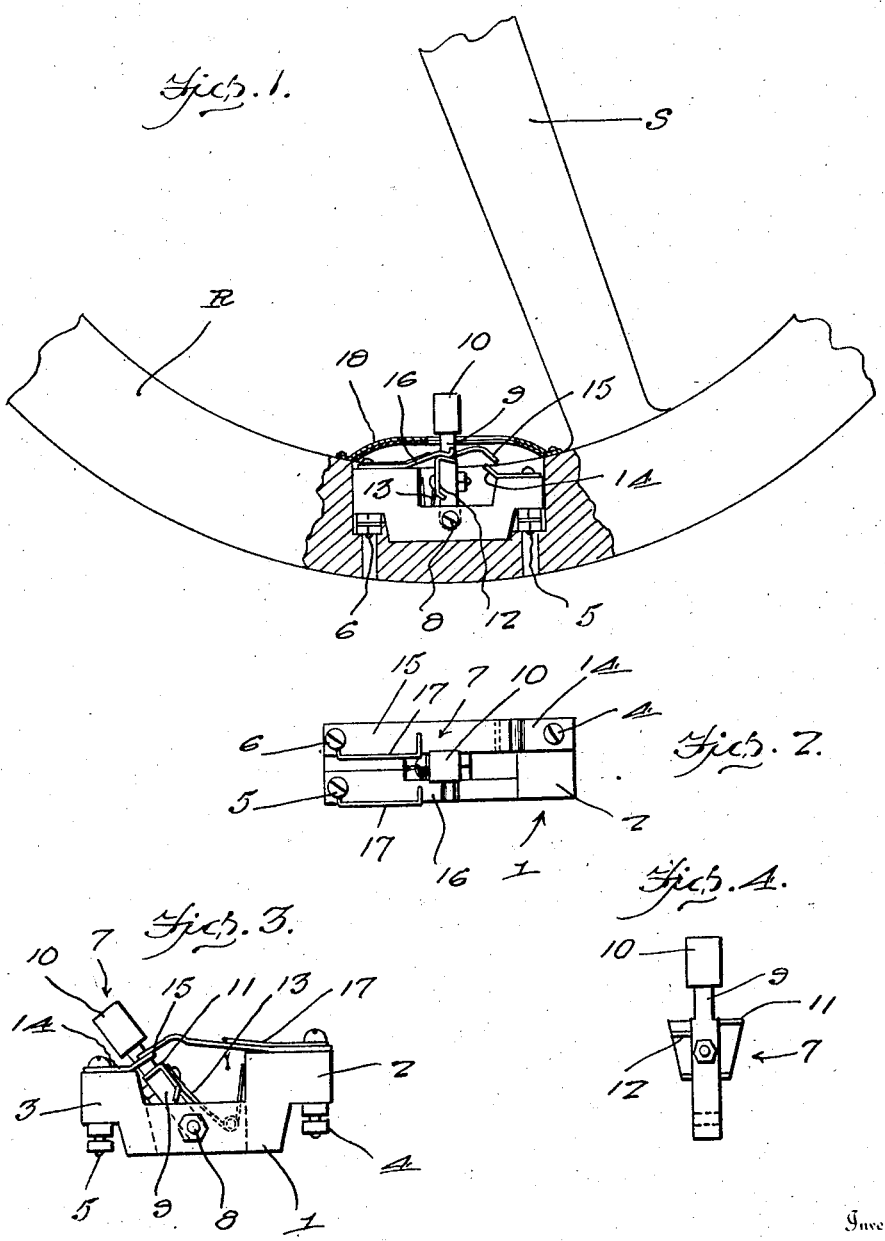
Inventor
B. F. Savery
By Clarence A. O'Brien
Attorney Patented Sept. 6, 1927.

1,641,905

UNITED STATES PATENT OFFICE.

BENJAMIN F. SAVERY, OF DEXTER, MICHIGAN.

AUTOMOBILE HEADLIGHT SWITCH.

Application filed October 1, 1925. Serial No. 59,872.

This invention relates to certain new and useful improvements in switch constructions, and it has reference to a switch which is adapted for association with the spokes and rim of a steering wheel, the same being embedded in the rim at a convenient point, either on the left or right hand side, and connected in circuit with the headlight, and with an appropriate dimmer resistance element for permitting the headlight to be rendered dim or bright, as circumstances require.

My principal aim is to generally improve upon structures of this kind by providing one of comparative simplicity and durability which is compact, not likely to get out of order or become inoperative, such in construction that it can be installed without appreciable alteration in the wiring system or steering wheel structure.

More specifically, it is an object to provide a switch of this kind embodying a body of insulation material, this body being embedded in the rim, and carrying appropriately associated contacts with which a hand operated element cooperates, the contacts being so arranged and constructed as to provide a means for holding the operating member in either position to which it is moved, whereby to permit the bright lights to be maintained on, or the dim lights to be maintained, and to make for a ready and almost instantaneous change from one to the other.

Other features and advantages of the invention will become apparent from the following description and drawing.

In the accompanying drawing forming a part of this application, and in which like numerals are employed to designate like parts throughout the same:

Figure 1 is a fragmentary top plan view of a portion of an automobile steering wheel showing the improved switch embedded in the rim thereof.
. Figure 2 is a top plan view of the switch proper.

Figure 3 is a side view of said switch.

Figure 4 is a detail elevational view of the hand operated member for controlling the bright and dim lights.

In the drawings, in Figure 1, the reference characters S designates one of the spokes of a conventional hand wheel, and R designates the rim thereof. As stated, the improved switch is embedded in the rim, and it may be either on the left or right side, and located at any part to suit an individual driver.

The switch comprises a body 1 of insulation material, either gutta-percha or porcelain. This body is formed with end extensions 2 and 3, the first named of which carries a binding post 4, and the second named of which carries two binding posts 5 and 6. These extensions are disposed on a plane above the central portion, and this central portion is formed with a recess to accommodate the hand operated member indicated generally by the reference character 7. The member is pivotally mounted in the recess, as indicated at 8, and comprises a shank 9 of polygonal cross section and a finger grip 10 of suitable configuration and preferably of insulation material. While considering this operating member it should be noted that it is provided on one side with a metallic shoulder 11, and on the opposite side with a similar shoulder 12. The shoulder 11 is of greater length than the shoulder 12. Moreover, a suitable spring 13 is mounted in the body and cooperates with the operating member to push it in a direction to normally maintain the bright lights on.

By directing attention to Figure 3, it will be seen that a relatively stationary contact strip 14 is connected with the binding post 5, and a relatively movable contact strip 15 is connected with the binding post 4. The ends of these two strips are overlapped and of the approximate shape shown. Then by referring to Figure 2, it will be seen that a third contact strip 16 is fastened to the binding post 5. This strip is yieldable and has its free end of the shape shown in the figure last named. The shoulder 12 cooperates with the contact strip 16, while the shoulder 11 cooperates with the contact strip 15. In fact, these two shoulders act somewhat as cams. Suitable springs 17 cooperate with the strips 15 and 16.

In practice, the body 1 is seated in an appropriate recess formed in the rim R, and holes are bored in the rim to accommodate wires (not shown) which are connected with the several binding posts. Then a suitably designed face or cover plate 18 is fastened over the recess to hide the body and a strip of insulation is interposed between this plate and the rim as shown plainly in Figure 1. Both of these parts are slotted to accommodate the shank 9 of the operating member 7. The finger piece 10 projects beyond the same and constitutes a lever which may be pushed one way or the other to obtain the intensity of light desired.

One of the bright light wires is connected with the binding post 4, another bright light wire is connected with the binding post 6, and a dimmer wire is connected with the post 5. A suitable resistance coil or element is included in the last named wire. The wiring system will vary according to circumstances, and no further description need be entered.

It is obvious that when the operating lever 7 is in the substantially central or straight position shown in Figure 1, the shoulder 11 has engaged the contact strip 15 and moves it away from the contact strip 14, thereby leaving a gap and breaking the circuit between the wires connecting with the binding posts 4 and 6. At the same time the shoulder 12 has engaged the strip 16, bringing the resistance into play and providing dim lights. The spring pressure on the contact strip 16 holds the lever in this position. By striking the lever lightly with the thumb and moving it in a direction from left to right, the contact shoulder 12 is disengaged from the strip 16, and the two strips 14 and 15 are brought into engagement to bring on the bright lights again. The relation of the contacts is such that the shift from the bright to the dim lights may be made without a break, and this is a decided advantage over old and well known switches which permit a momentary time between the change from bright to the dim lights when no light is on.

A careful consideration of the description in connection with the drawing will undoubtedly enable persons familiar with inventions of this class to obtain a clear understanding of the same. For this reason, a more lengthy description is thought unnecessary.

While the preferred embodiment of the invention has been shown and described, it is to be understood that minor changes coming within the field of invention claimed may be resorted to if desired.

Having thus described the invention, what is claimed as new is:—

As a new product of manufacture, an automobile headlight switch comprising a body constructed for placement upon the rim of a steering wheel and having a central recessed portion, three binding posts carried by said body, three contact strips, associated with said body, there being a strip connected with each post, two of said strips being arranged in longitudinal alinement with each other and having inner adjacent ends directed angularly and in overlapping relation, the remaining strip having its inner end portion directed angularly and located over the recess in said body, a pivotally mounted lever carried by said body and located in said recess, and contact shoulders on opposite sides of the central portion of the lever, said shoulders being formulated to provide cams for engagement with the angularly directed inner end portions of said strips.

In testimony whereof I affix my signature.

BENJAMIN F. SAVERY.